US005528283A

United States Patent [19]

Burton

[11] Patent Number: 5,528,283
[45] Date of Patent: Jun. 18, 1996

[54] SWITCHED VIDEO DISTRIBUTION APPARATUS

[75] Inventor: Larry W. Burton, Raleigh, N.C.

[73] Assignee: Alcatel Network Systems, Inc., Richardson, Tex.

[21] Appl. No.: 901,916

[22] Filed: Jun. 22, 1992

[51] Int. Cl.⁶ .................................................. H04M 11/00
[52] U.S. Cl. .............................. 348/13; 455/3.1; 455/4.1; 455/4.2; 455/6.3
[58] Field of Search .......................... 358/85, 86; 379/53, 379/102, 104, 105, 96; 455/3.1, 4.1, 4.2, 5.1, 6.3, 6.1; 348/13, 14, 16

[56] References Cited

U.S. PATENT DOCUMENTS

| | | |
|---|---|---|
| 3,757,225 | 9/1973 | Ulicki . |
| 4,345,273 | 8/1982 | Barabas et al. . |
| 4,430,731 | 2/1984 | Gimple et al. . |
| 4,441,180 | 4/1984 | Schussler . |
| 4,481,621 | 11/1984 | Schmack et al. . |
| 4,686,667 | 8/1987 | Ohnsorge . |
| 4,704,715 | 11/1987 | Shibagaki et al. . |
| 4,709,418 | 11/1987 | Fox et al. . |
| 4,723,237 | 2/1988 | Andrew et al. . |
| 4,763,326 | 8/1988 | Krick . |
| 4,891,694 | 1/1990 | Way . |
| 4,947,244 | 8/1990 | Feawick et al. ......................... 455/5.1 |
| 4,949,170 | 8/1990 | Yanagidaira et al. . |
| 4,959,862 | 9/1990 | Davidov et al. . |
| 4,972,183 | 11/1990 | Kuhlmann et al. . |
| 5,029,333 | 7/1991 | Graves et al. . |
| 5,136,411 | 8/1992 | Paik et al. ................................. 358/86 |
| 5,175,639 | 12/1992 | Takasaki . |
| 5,181,106 | 1/1993 | Sutherland ................................ 358/86 |
| 5,198,899 | 3/1993 | Cang .......................................... 358/86 |

FOREIGN PATENT DOCUMENTS

| | | |
|---|---|---|
| 386482 | 2/1990 | European Pat. Off. . |
| 2149617 | 6/1985 | United Kingdom . |
| 8909518 | 10/1989 | WIPO . |

OTHER PUBLICATIONS

"A Future Switched Video System" by John R. Gunter, Feb. 1990 IEEE LCS Magazine, pp. 66–72.
"A Hybrid Lightwave Transmission System for Subcarrier Multiplexed Video and Digital B–ISDN Services in the Local Loop" by Charles N. Lo, Journal of Lightwave Technology, vol. 7, No. 11, Nov. 1989, pp. 1839–1848.
"A High–Quality Switched FM Video System" by David E. Robinson and David Grubb III, Feb. 1990 IEEE LCS Magazine, pp. 53–59.
"Fiber Optic Analog–Digital Hybrid Signal Transmission Employing Frequency Modulation" by Ken–Ichi Sato et al, IEEE Transactions on Communications, vol. Com–33, No. 5, May 1985, pp. 433–441.

Primary Examiner—Curtis Kuntz
Assistant Examiner—Stella L. Woo
Attorney, Agent, or Firm—Ware, Fressola, Van Der Sluys & Adolphson

[57] ABSTRACT

A communication system is provided for the distribution of switched video, along with telephony and control information, over fiber from a central office to a subscriber premises. The system can dynamically allocate video channels to subscribers using a pool of switched channel selector units located at the central office, thus permitting increased sharing of video distribution resources and controlling access to all channels. The system can provide a multiplicity of simultaneously available switched channels at each subscriber premises from a selection of over a hundred channels available at the central office. Subscribers are connected to the switched video service through a switched video distribution system rack. Switched channels will travel over single-mode fiber in AM/VSB format compatible with subscriber video equipment.

21 Claims, 7 Drawing Sheets

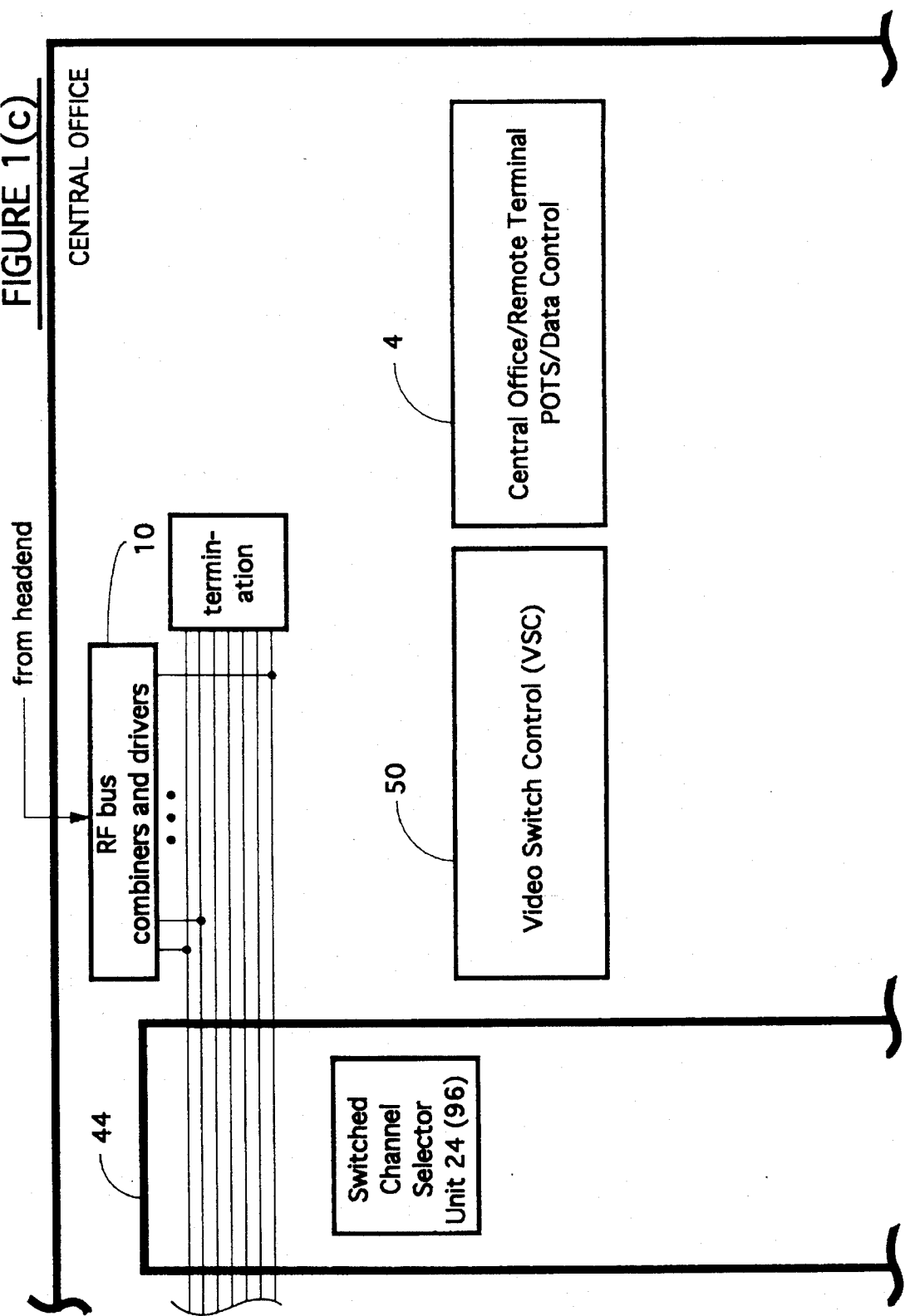

FIG. 4(a)
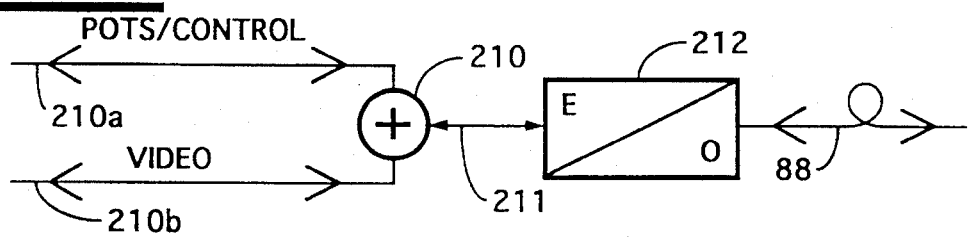
FIG. 4(b)
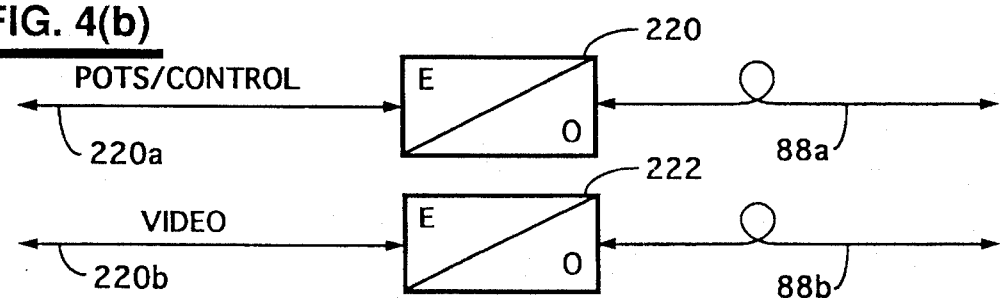
FIG. 4(c)
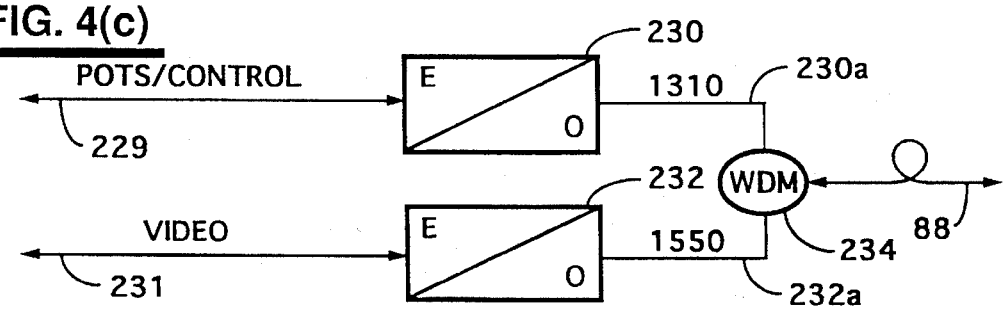
FIG. 4(d)
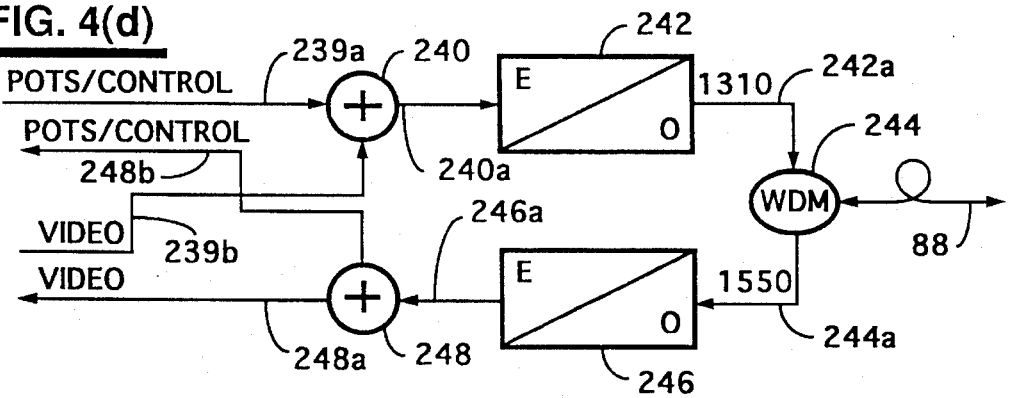
| FIGURE 1(a) | FIGURE 1(c) |
|---|---|
| FIGURE 1(b) | FIGURE 1(d) |
FIGURE 1

SWITCHED VIDEO DISTRIBUTION APPARATUS

FIELD OF THE INVENTION

The present invention relates to a system for providing switched video services, and more particularly to a switched video distribution system.

BACKGROUND OF THE INVENTION

The rapid proliferation of optical fiber telecommunications systems has made possible the provision of broadband services to individual subscribers on a relatively universal basis. Such broadband services often include data transmission; however, there is a broader market for the distribution of video signals over the telecommunications network.

The provision of such video services has long been desired; however, the previously proposed systems have all been subject to various deficiencies which have prevented their commercial acceptance. Video signals may be broadcast to all subscribers over optical fibers; however, this severely limits the programming selection and the number of channels that may be available to each subscriber. A switched video architecture allows for the provision of significantly more programming options and control of distribution only to authorized subscribers.

The concept of switched video transmission systems has been proposed in the past; however, most proposals have had undesirable features. Most proposed switched video architectures require the use of a second optical fiber to distribute the broadband services. The use of two fiber systems to distribute the broadband video service is inefficient in that the second fiber must be installed during the initial deployment of the system when there are extremely high equipment expenses. Currently, regulatory agencies do not always permit recovery of costs associated with a second fiber for broadband services.

Other systems have used a separate narrowband telephone connection for keying in control data in the upstream direction using a telephone subset. Such systems are not truly integrated and require the use of the premises telephone subset to transmit control information upstream for selection of the desired video. The RCV-1G system (i.e. Reseau Communication Video 1G) provided by Alcatel used a dedicated FSK subcarrier electrically multiplexed with the narrowband and video for control purposes. Thus, the prior art has not provided a commercially acceptable architecture for mass deployment of switched video on a telecommunications network.

In still other known systems, there is an undesirable need to use expensive tuners or converters on each set to selectively distribute both scrambled and descrambled channels. This problem is further aggravated by subscribers who use unauthorized converters to descramble channels to avoid paying service charges, which results in large economic loss to the provider of the service.

SUMMARY OF THE INVENTION

In its broadest sense, the invention provides apparatus comprising central control means responsive to subscribers and a plurality of central video switching means dynamically allocatable by the control means.

In further accord with the present invention, the control means is responsive to a plurality of video channel select signals from a corresponding plurality of subscribers, for providing a corresponding plurality of video switch control signals. The plurality of subscribers may be provided from a larger plurality or neighborhood pool of subscribers not all of whom will be demanding video services at any given time. In other words, the number of potential users may be greater than the number of video switching means. Each of the plurality of video switching means is responsive to a plurality of video information signals and each is further responsive to a respective one of the video switch control signals, for providing a respective one of the video information signals for an associated one of the subscribers which is not always the same video information signal or subscriber.

In one particular embodiment, the apparatus is a communication system which provides for the distribution of switched video, along with telephony and control information, over fiber from a central office to near a subscriber premises. The system switches video channels to subscribers using a pool of switched channel selector units located at the central location which may be dynamically allocated, thus permitting increased sharing of video distribution resources and controlling access to all channels. The system provides a multiplicity of simultaneously available switched channels at each subscriber premises from a selection, for example, over a hundred channels available at the central office. Subscribers are connected to the switched video service through a switched video distribution system rack. Switched channels travel over single-mode fiber in AM/VSB format compatible with subscriber video equipment. The embodiment shown can serve on the order of a hundred subscribers in a number of neighborhoods but of course the concept can be extended or even set up differently.

DESCRIPTION OF THE DRAWING

FIGS. 4(a), (b), (c) and (d) shows various embodimentts of a central office, according to the present invention.

DETAILED DESCRIPTION OF THE INVENTION

A. A Central Location

Figure 1A:
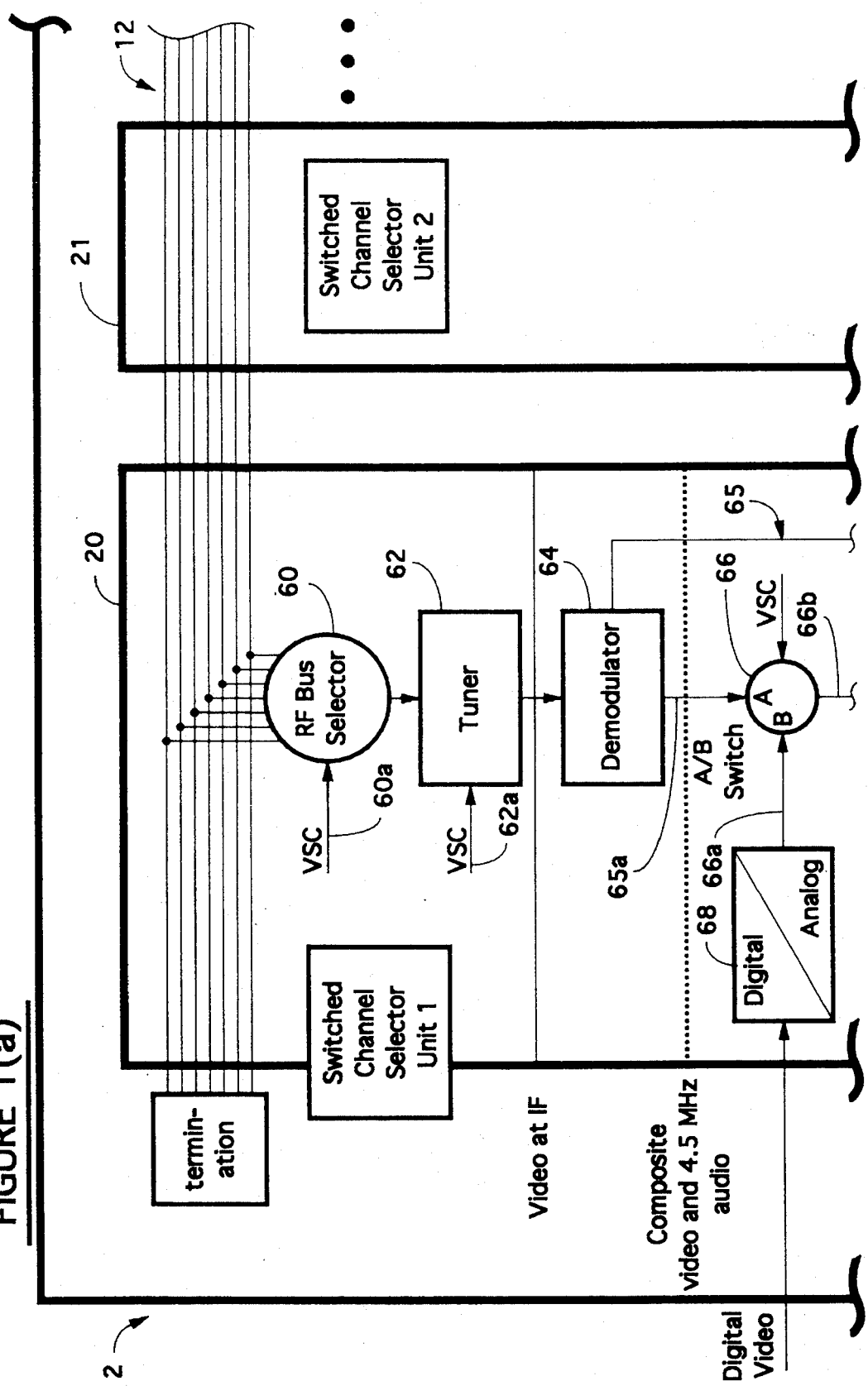
FIG. 1, including 1(a), 1(b), 1(c) and 1(d), shows a block diagram of a central office of a communication system, according to the present invention.

As shown in FIGS. 1(a) and 1(c), a central office 2 may perform a switching function for a switched video distribution system, according to the present invention. It has a central office/remote terminal plain ordinary telephone service (POTS)/data controller 4 (see FIG. 1(c)) which handles administrative system functions, such as collecting and managing billing, accessing system information, and managing information relating to the POTS (i.e. plain old telephone service), as well as general control information involved in switched video transmission.

The video signal received from a cable headend (not shown) includes a multiplicity of video channel signals over a wavelength division multiplexed fiber optic super trunk. In one embodiment at least 100 and potentially as many as 500 video channels are received from the super trunk. Channels are then combined and placed onto RF bus combiners and drivers 10 (see FIG. 1(c)) and passed to a plurality of video signal buses 12 (see FIG. 1(*a*). It should be realized however that a single bus could be provided.

Figure 1B:
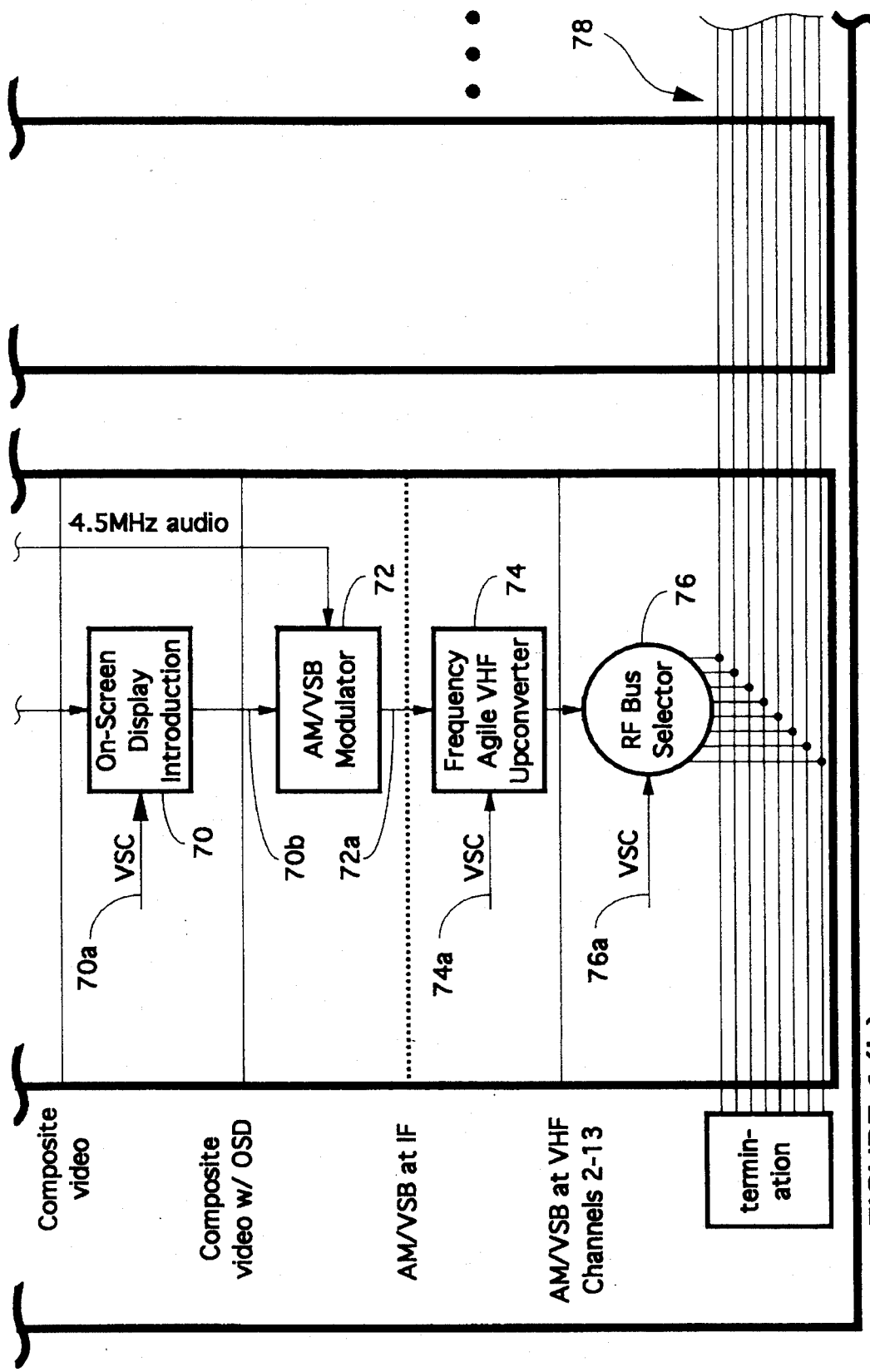
Figure 1D:
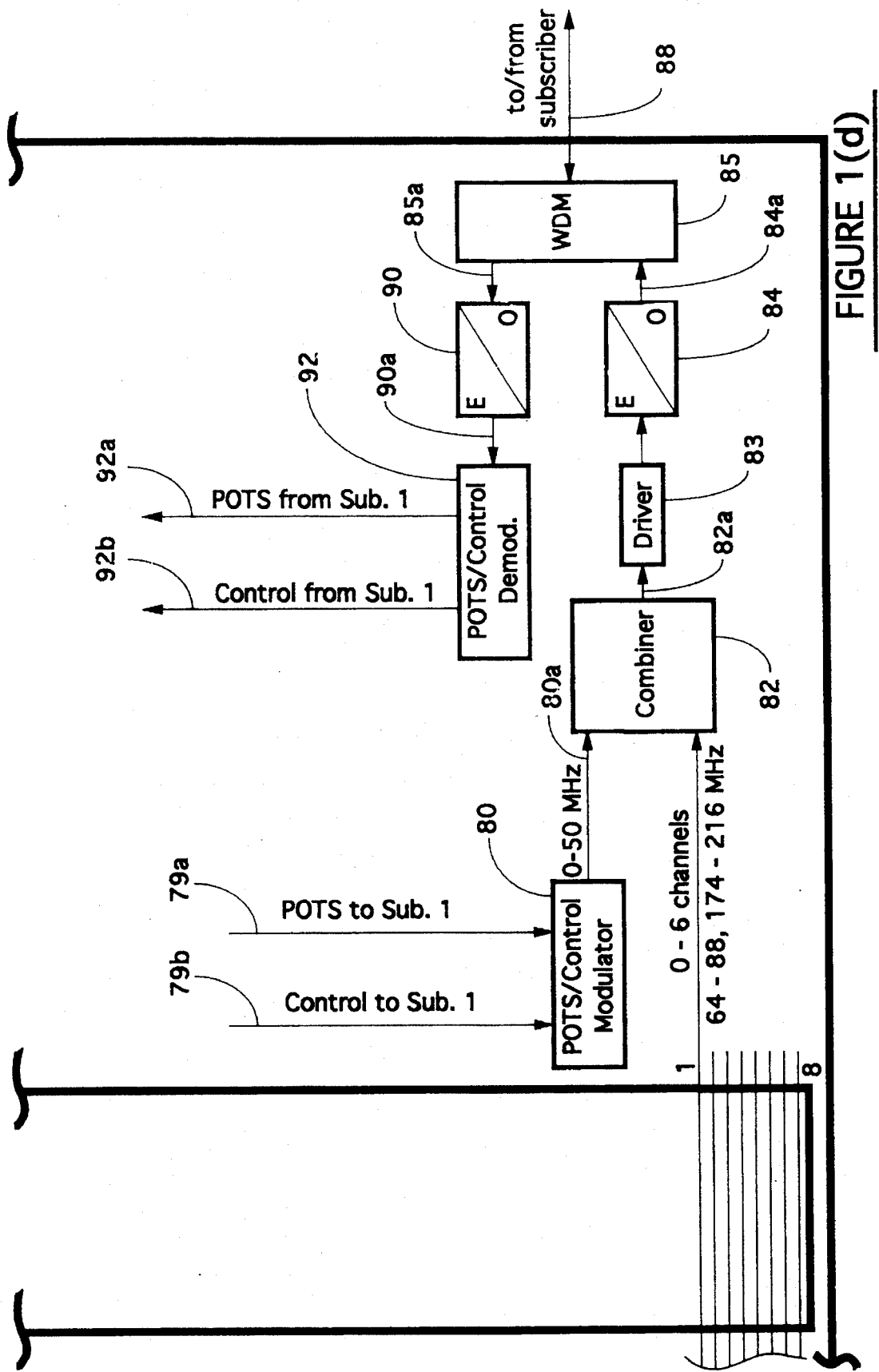

As shown in FIGS. 1 and 1(*a*)–1(*d*), the central office 2 includes a plurality of switched channel selector units (SCSU) 20, 21, ..., 44. Each SCSU receives video switch control signals from a video switch controller (VSC) 50 (see FIG. 1(*c*)). In response to a control signal indicative of a video channel selected by a subscriber, one of the SCSUs is dynamically assigned to distribute the selected video channel to the subscriber.

As shown in FIGS. 1(*a*) and 1(*b*), the embodiments where a plurality of buses 12 are used, each SCSU may have an RF bus selector 60 that allows a tuner 62 to access the video signal buses 12 in response to a video switch control signal on a line 60*a* from the VSC 50. Once one of the buses 12 is selected, the tuner 62 may be used to convert the selected video information signal to an intermediate frequency IF, i.e., from the selected one of video channels on the bus 12, in response to the video switch control signal on a line 62*a* from the VSC 50. In one embodiment the intermediate frequency is chosen to be 45.75 MHz as in U.S. receivers.

The selected channel on the intermediate frequency carrier is then passed to a demodulator 64, where it is demodulated to separate the audio signal separated at 4.5 MHz on a line 65 from the video and provide a baseband video signal on a line 65*a*. The baseband signal may be applied to an A/B switch 66, responsive to a VSC signal on a line 66*a* and which also receives a video signal passing through a digital-to-analog converter 68. This digital signal is an alternative means (to the analog supertrunk) of delivering video signals to the central office. The selected baseband video signal is delivered from the A/B switch (66) on line 66*b* to the On Screen Introduction Display (70) as best shown in FIG. 1(*b*). The OSD 70 is responsive to the $V_{in}$ line 70*a* from the VSC to effect the superimposition of alpha-numerical or graphical characters onto the baseband video signal for purposes of providing control feedback to the subscriber, e.g. channel number. The converted digital signal on line 66*b* is also illustrative of means by which digital video sources such as video conference signals may be introduced. The A/B switch 66 passes one of the two signals to an on-screen display OSD device 70, which provides a composite video signal on a line 70*b* combining the incoming selected video channel signal from switch 66 and an OSD signal. The OSD signal enables the subscriber to see what channel is being viewed on his screen or can be used for control purposes such as providing various menus for selection. The main purpose of the tuning step is to get the selected video channel into a convenient frequency level which can be manipulated prior to being used to modulate a new carrier selected to match the subscriber's tuned station. The reason for the demodulating down to the baseband video is to be easily able to insert the on-screen information. Thus it should be realized if the on-screen display information is not needed or desired by the subscriber, then the demodulation step need not be done. In another embodiment shown, the OSD device 70 has color capability, and should be phase-locked to the color burst in the incoming composite video signal.

The recombined baseband video on the line 70*b* is passed to an AM/VSB modulator 72, where the composite signal on the line 70*b* and the audio signal on the line 65 are recombined and modulated using an AM modulation scheme at an IF of 45.75 MHz. A frequency agile upconverter 74 in each SCSU may be used to convert from the IF to a VHF, UHF, or similar channel assigned to a receiver in the premises of the subscriber requesting video service in response to a VSC signal on a line 74*a*. The control signal on the line 74*a* from the VSC 50 determines the frequency of the upconverter 74. As will be discussed in more detail below, at each subscriber premises, for example, up to twelve individual receiver (television or VCR) units may be assigned separate, fixed, VHF channels (2 thru 13) on which they receive a separate video channel. Additional video outlets may simultaneously tune to any of the twelve selected channels.

An 1×8 RF multiplexer 76 may be used to complete the connection of the selected channel to the correct subscriber. An RF multiplexer 76 connects to a particular one of a plurality of subscriber busses 78 and thereby combines an individual selected channel with other video signals provided by other SCSUs on the particular subscriber bus at different frequencies. In one embodiment the frequency ranges of the channels are chosen to be 54–88, ..., 174–216 MHz. It will thus be understood that each subscriber premises may have a number of video receivers each tuned differently to receive different ones of the combined video channels. As shown, each SCSU can access any one of eight subscriber buses 78*a*, 78*b*, ..., 78*h*, which each provide 0–6 channels, as shown, and may provide up to 12 channels. This provides the dynamic allocation capability of the present invention, i.e., even though there may be a very large number of subscriber receiver controls (not shown) capable of seizing a SCSU for selecting a channel it may be assumed that only a limited number of these subcriber controls will be operative at any one time so that a smaller number of SCSUs may be provided than would be necessary in the case of dedicated tuners for each receiver.

A system, according to the present invention, may also be equipped to provide telephony and control signals to and from each subscriber which may be carried on telephony voice channels. The video and control information may also be combined with the POTS service. In such an implementation for subscriber 1, as shown in FIG. 1(*d*), a POTS/Control modulator 80 receives a control signal on line 79*a* and POTS signal on line 79*b* and provides a modulated telephony and control signal on line 80*a* for the subscriber. In one embodiment, the modulated telephony and control signal on line 80*a* is in a frequency range of between 0–50 MHz. The control signals on line 79*b* to the subscriber may be used additionally for any purpose, such as controlling HVAC, alarm signals, etc. A combiner 82 receives the modulated telephony and control signal on line 80*a* and combines it with the video information signal on subscriber bus 78*a*, providing a combined video, telephony and control signal on line 82*a*. This combined signal is passed through a driver 83 and electrical/optical converter 84, for providing a combined video, telephony and control optical signal on line 84*a*, which is passed to a wavelength division multiplexer (WDM) 85.

The WDM 85 multiplexes the combined video, telephony and control signal on line 84*a*, and a combined WDM telephony and control optical signal on line 88 received from the ONU 100 from each subscriber to the central office 2, and provides a combined telephony and control signal on line 85*a*, and a combined WDM video, telephony and control optical signal on line 88. How the ONU 100 for each subscriber provides the combined WDM telephony and control optical signal on line 88 will be explained in more detail below with respect to FIG. 3.

Moreover, in the central office 2, an optical/electrical converter 90 converts the combined WDM telephony and control optical signal on line 85 and provides a combined telephony and control electrical signal on line 90*a*. A POTS/Control demodulator 92 demodulates the combined telephony and control electrical signal on line 90a and provides a telephony signal on line 92a and a control signal on line 92b.

Other embodiments of the central office 2 are shown in FIGS. 4(a)–(d). For example, in FIG. 4a, the video, POTS and control signals are electrically multiplexed, converted to an optical signal, and transmitted to a respective subscriber. In operation from the central office 2 to and ONU 100, in response to a POTS and control signal on line 210a and a video information signal on line 210b, a frequency division multiplexer 210 provides a combined video, POTS and control signal on line 211. In response to the combined video, POTS and control signal on line 211, an electrical/optical converter 212 provides a combined video, POTS and control optical signal on line 88. This combined optical signal can be bidirectionally transmitted via one fiber optic waveguide on line 88 to and from the respective subscriber. From the ONU 100 to this central office 2, a similar combined optical signal is electrical/opically converted then electrically demultiplexed.

In FIG. 4b, the video, POTS and control signals are separately converted to an optical signal and transmitted via an associated waveguide to a respective subscriber. In operation from the central office 2 to the ONU 100, in response to a POTS and control signal on line 220a, a first electrical/optical converter 220 provides a POTS and control optical signal on line 88, which can be transmitted to and from the respective subscriber via a first fiber optic waveguide 88. In response to a video signal on line 220b, a second electrical/optical converter 222 provides a video optical signal on line 88b, which can be transmitted to and from the respective subscriber via a second fiber optic waveguide 88.

In FIG. 4c, the video, POTS and control signals are converted, wavelength division multiplexed and transmitted to a respective subscriber via an associated waveguide. In operation from the central office 2 to the ONU 100, in response to a POTS and control signal on line 229, a first electrical/optical converter 230 provides a POTS and control optical signal on line 230a. In one embodiment the optical signal on line 230a is generated at a wavelength of 1310 nanometers. In response to a video signal on line 231, a second electrical/optical converter 232 provides a video optical signal on line 232a. In one embodiment the optical signal on line 232a is operated at a wavelength of 1550 nanometers. In response to the POTS and control optical signal on line 230a and the video information optical signal on line 232a, a wavelength division multiplexer 234 provides a combined WDM video, POTS and control optical signal on line 88, which is transmitted to and from the respective subscriber via a second fiber optic waveguide 88.

In FIG. 4d, the video, POTS and control signals to the ONU 100 are electrically multiplexed, optically converted, and wavelength division multiplexed with the video, POTS and control signals from the ONU 100, which are then electrically converted and demultiplexed. In operation from the central office 2 to the ONU 100, in response to a POTS and control signal on line 239a and a video signal on line 239b, a first frequency division multiplexer 240 provides a combined video, POTS and control electrical signal on line 240a. In response to the combined video, POTS and control electrical signal on line 240a, a first electrical/optical converter 242 provides a combined video, POTS and control optical signal on line 242a. In response to the combined video, POTS and control optical signal on line 242a, and a combined WDM video, POTS and control optical signal from a respective ONU 100, a wavelength division multiplexer 244 provides a combined WDM video, POTS and control optical signal on line 88 to the ONU 100 for the respective subscriber, and further provides a combined video, POTS and control optical signal on line 244a from the respective ONU 100. In one embodiment the combined video, POTS and control optical signal on line 242a is generated at a wavelength of 1310 nanometers, and the combined video, POTS and control optical signal on line 244a from the ONU 100 is generated at a wavelength of 1550 nanometers. In response to the combined video, POTS and control optical signal on line 244a from the respective ONU 100, a second electrical/optical converter 246 provides a combined video, POTS and control electrical signal on line 246a. In response to the combined video, POTS and control electrical signal on line 246a, a second frequency division multiplexer 248 provides a POTS and control electric signal on line 248b and a video electrical signal on line 248a.

B. The Video Distribution Rack

Figure 2:
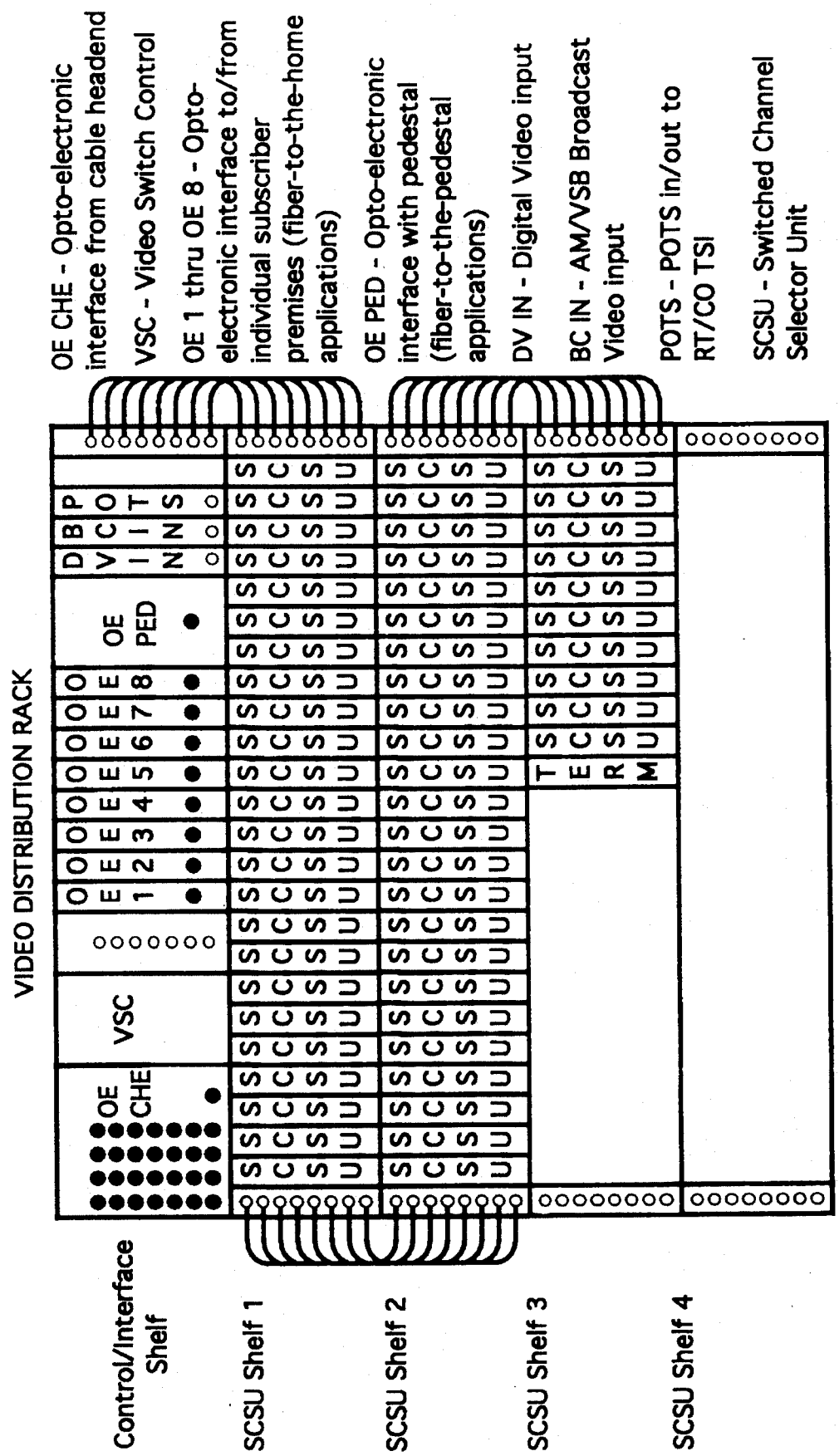
FIG. 2 shows a diagram of a video distribution rack, according to the present invention.

A rack with a plurality of shelves, such as five shelves (shown in FIG. 2) may also be provided for allocation of switched channels and telephony to at least eight subscribers. In one embodiment, one of the shelves is used for control/interface, and four of the shelves contain channel selector units. Each of the SCSU shelves can hold up to 24 units, such as shelf 1 and 2 shown. At full capacity, the rack has 96 SCSUs and can provide twelve switched channels to each of eight subscribers.

In one embodiment, 24 units, encompassing a single shelf in the rack, would be provided for eight subscribers. While the average number of switched channels per subscriber would be three, the dynamic allocation of switched channel selectors permitted in this architecture allows individual subscribers to access at least six channels. As the simultaneous demand for switched channels grows, additional switched channel selector units can be added to the pool by adding shelves. Eventually each subscriber could be permitted to access an average of twelve switched channels.

The SCSU design permits a high level of modularity and expansion capability, which will enable growth potential for the system.

Furthermore, on the control/interface shelf, there is a slot for an OE CHE interface for an optical/electrical interface from the cablehead. There is also a slot for the VSC 50, and eight optical/electrical interfaces to/from a respective one of the eight individual subscriber premises. The OE PED slot is for an optical electrical interface with a pedestal in a fiber-to-the-pedestal application. A DV IN input is for receiving digital sigals by the digital to analog converter 68 (See FIG. 1). A BC IN input is for receiving the AM/VSB broadcast video input. A POTS input is for receiving a plain ordinary telephone input.

C. The Optical Network Unit (ONU)

Figure 3:
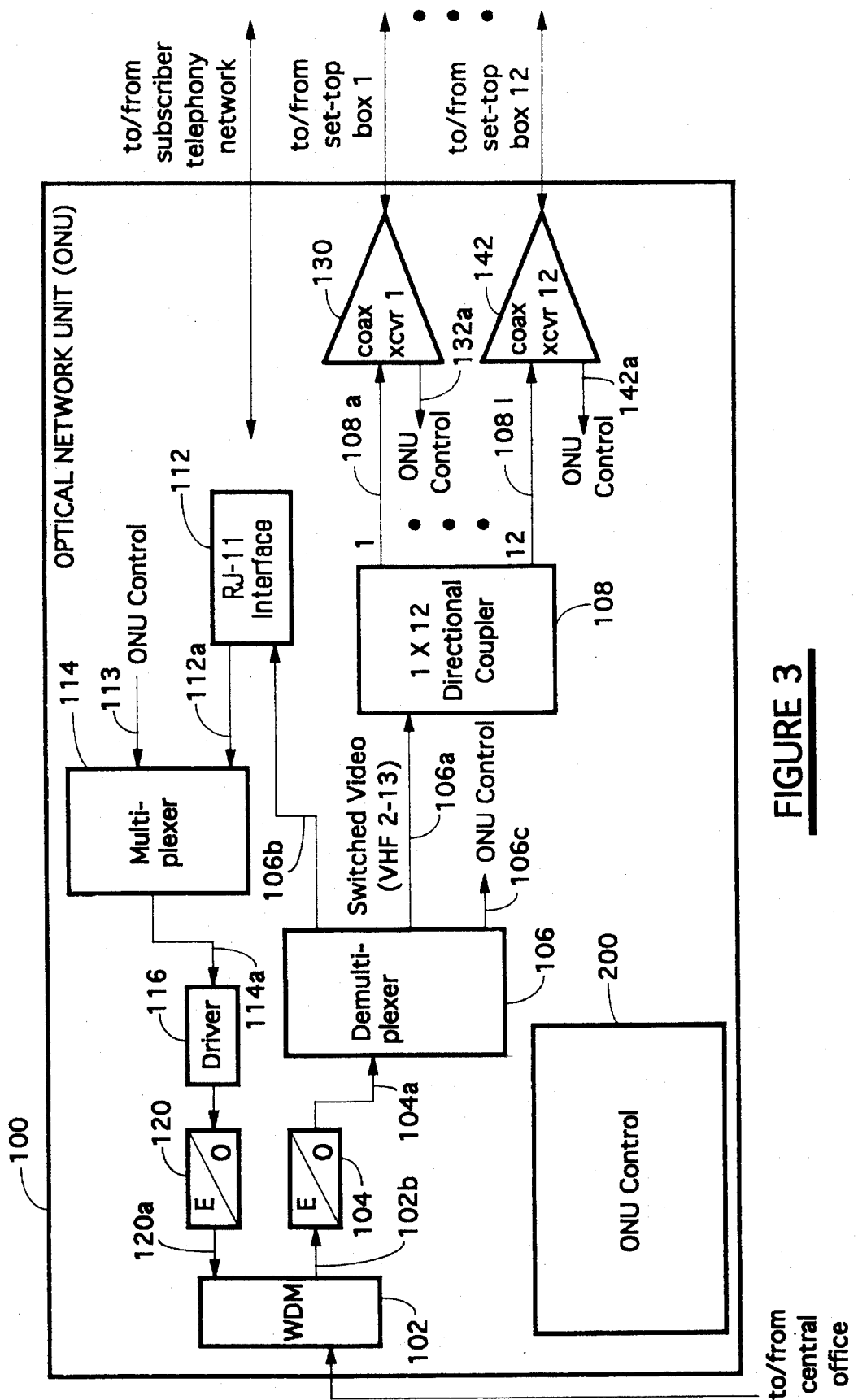
FIG. 3 shows a block diagram of an optical network unit, according to the present invention.

FIG. 3 shows an optical network unit (ONU) 100. In general, it is designed to reside externally at or near the subscriber premises, and provide plain ordinary telephone service (POTS) to the subscriber and a number of video channels to the subscriber premise. In order to do this, the ONU 100 must demultiplex the POTS and video services and to distribute them over a metallic connection to set-top units (not shown) and telephones (not shown) throughout the subscriber premises (not shown). The ONU also buffers control signals from set-top units (not shown) and transmits them, along with telephony, back to the central office. Remote control units (not shown) provide viewer interface to the set-top units (not shown).

From the central office 2, the ONU 100 receives a combined WDM video, telephony and control optical signal on line 88. In the ONU 100, a wavelength division multiplexer 102 multiplexes the combined WDM video, telephony and control optical signal on line 88 received from the central office 2 with a combined telephony and control optical signal on line 120a from an electrical/optical converter 120 and provides a combined video, telephony and control optical signal on line 102b, and further provides a combined WDM telephony and control signal on line 88. In response to the combined video, telephony and control optical signal on line 102b, an optical/electrical converter 104 provides a combined video, telephony and control electrical signal on line 104a. In response to the signal on line 104a, the demultiplexer 106 provides a separate switched video signal on line 106a, a separate telephony signal on line 106b, and a separate ONU control signal on 106c. The separate video signal on line 106a is passed to a 1×12 directional coupler 108, for coupling the video signal to one of twelve VHF channels to 2 through 13 on lines 108a, . . . , 108l. As shown the ONU 100 can provide upto 12 different channels to 12 different subscribers in a household, i.e. one on VHF channel 2, one on VHF channel 3, . . . , and one on VHF channel 13. Each of the signals leaving the directional coupler 108 is buffered by a coax coupler 130, . . . , 142 respectively. (It can also be understood that the number of video outlets per home may be expanded by further dividing the video signal power among more video outlets using standard master antenna television (MATV) equipment.

To and from the subscriber, the separate telephony signal on line 106b from the demultiplexer 106 is passed through an RJ-11 interface 112. From the subscriber, the outgoing telephone signal may pass from the RJ-11 interface 112 on line 112a and be passed to a multiplexer 114. The multiplexer 114 combines an ONU control signal on line 113 and the telephony signal from the subscriber on line 112a, providing a combined telephony and control signal on line 114a. The combined telephony and control signal on line 114a is passed through a driver 116, and an optical/electrical converter 120, which proves a combined telephony and control optical signal on line 120a, which is passed to the wavelength division multiplexer 102, as explained above. The ONU 100 also includes a ONU controller 200 for providing the ONU control signals shown.

The system could also be used for control purposes, such as controlling heating, ventilation, air conditioning (i.e. HVAC), burglar alarms, banking, etc.

Some of the advantages of the system is that video switching is performed at the central office, not at the subscriber premise, thus permitting economical allocation of expensive switching equipment on an "as needed" basis. The system also reduces the need for expensive converters at the subscriber premises, reduces the opportunity for unauthorized converters which descramble stations. This problem has plagued the cable industry for years. Also, the invention shows an interactive approach between the subscriber and a central office that potentially opens up a whole new field of communications opportunities. Also, the disclosed approach substantially eliminates the potential for pirating video channels with unauthorized conversion equipment.

What is claimed:

1. Switched video distribution apparatus, comprising:
   video receiving means (10) having RF bus combiners and responsive to video headend signals, for providing a plurality of video information signals;
   video switch assignment control means (50), responsive to a plurality of video channel select signals from a corresponding plurality of subscribers, for providing a corresponding plurality of video switch assignment control signals; and
   a plurality of dynamically assignable video switch means (20, 21, . . . , 44), each responsive to the plurality of video information signals, and each further responsive to a corresponding one of the video switch assignment control signals, for providing a corresponding selected one of the video information signals for an associated one of the subscribers.

2. Apparatus as claimed in claim 1, wherein each of the plurality of video switching means (20, 21, . . . , 44) includes an RF bus selector means (60), responsive to the selected one of the video switch control signals and further responsive to the video information signals, for providing the corresponding selected one of the video information signals.

3. Apparatus as claimed in claim 1, wherein said apparatus further comprises a corresponding plurality of subscriber buses (78a, 78b, . . . , 78h), each responsive to the selected one of the video information signals, each for providing one or more of the video information signals to a respective one of the subscriber premises.

4. Apparatus as claimed in claim 3, wherein each of the subscriber buses (78a, 78b, . . . , 78h) has a separate frequency range, and each of 0–6 video channels is assigned a separate sub-frequency range therein.

5. Apparatus comprising:
   control means (50), responsive to a plurality of video channel select signals from a corresponding plurality of subscribers, for providing a corresponding plurality of video switch control signals; and
   a plurality of video switching means (20, 21, . . . , 44), each responsive to a plurality of video information signals and each responsive to a selected one of the video switch control signals, for providing a corresponding selected one of the video information signals for an associated one of the subscribers;
   wherein each of the plurality of video switching means (20, 21, . . . , 44) includes an RF bus selector means (60), responsive to the selected one of the video switch control signals and further responsive to the video information signals, for providing the corresponding selected one of the video information signals;
   wherein each of the plurality of video switching means (20, 21, . . . , 44) includes:
   i) tuning means (62), responsive to the corresponding selected one of the video information signals, for providing a tuned intermediate frequency signal;
   ii) demodulating means (64), responsive to the tuned intermediate frequency signal, for providing a demodulated baseband signal;
   iii) on-screen display signal means (70), responsive to the switched video control signal and responsive to the demodulated baseband, for providing a composite video and OSD signal;
   iv) modulation means (72), responsive to a composite video and OSD signal, for providing a modulated intermediate frequency signal;
   v) frequency agile means (74), responsive to the video switch control signal and the modulated intermediate frequency signal, for providing an upconverted signal.

6. Switched video distribution apparatus, comprising:
   video switch assignment control means (50), responsive to a plurality of video channel select signals from a corresponding plurality of subscribers, for providing a corresponding plurality of video switch assignment control signals; and a plurality of dynamically assignable video switch means (20, 21, . . . , 44), each responsive to the plurality of video information signals, and each further responsive to a corresponding one of the video switch assignment control signals, for providing a corresponding selected one of the video information signals;

wherein each of the corresponding plurality of dynamically assignable video switching means (20, 21, . . . , 44) includes a respective second RF bus selector means (76), responsive to an associated one of the corresponding plurality of video switch assignment control signals and further responsive to the plurality of video information signals, for providing the corresponding selected one of the video information signals for an associated one of the subscribers.

7. Apparatus as claimed in claim 6, wherein said apparatus further comprises:

a plurality of POTS/control modulator means (80), each responsive to a telephony signal for an associated subscriber and a control signal for the associated subscriber, each for providing a modulated telephony and control signal; and a corresponding plurality of combiners (82), each responsive to the selected video information signal for that subscriber and each further responsive to the modulated telephony and control signal, each for providing a combined video, telephony and control signal for the associated subscriber.

8. Apparatus as claimed in claim 7, wherein said apparatus further comprises:

a corresponding plurality of drivers and electrical-optical converting means (84), each responsive to the combined video, telephony and control signal, each for providing a combined video, telephony and control optical signal.

9. Apparatus as claimed in claim 8, wherein said apparatus further comprises:

a corresponding plurality of wavelength division multiplexing means (85), each responsive to the combined video, telephony and control optical signal, and further responsive to a combined WDM telephony and ONU control optical signal received from an optical network unit (ONU), each for providing a combined WDM video, telephony and control optical signal for transmitting to the subscriber, and for further providing a combined telephony and control optical signal from the optical network unit (ONU).

10. Apparatus as claimed in claim 9, wherein said apparatus further comprises:

a corresponding plurality of optical/electrical converting means (90), each responsive to the combine telephony and control optical signal, each for providing a combine telephony and control electrical signal; and a corresponding plurality of POTS/control demodulator means (92), responsive to the combined telephony and control electrical signal, each for providing a demodulated telephony signal and a demodulated control signal.

11. A communication system for distributing video channels to subscribers upon demand, comprising a) a central office (2) video switch assignment control means (50), responsive to a plurality of video channel select signals from a corresponding plurality of subscribers, for providing a corresponding plurality of video switch assignment control signals; and a plurality of dynamically assignable video switch means (20, 21, . . . , 44), each responsive to the plurality of video information signals, and each further responsive to a corresponding one of the video switch assignment control signals, for providing a corresponding selected one of the video information signals to an associated one of the subscribers; and b) a plurality of optical network units (100), each responsive to one of the selected video information signals from the central office, each for providing one of the selected video information signals to a respective subscriber and each for providing one of the video channel select signals.

12. A communication system as claimed in claim 11, wherein each of said plurality of subscriber optical network units (100) further comprises:

wavelength division multiplexing means (102), responsive to a combined WDM video, telephony and control optical signal received from the central office, and further responsive to a combined telephony and ONU control optical signal, for providing a combined video, telephony and control optical signal for the subscriber, and a combined WDM telephony and ONU control optical signal for the central office;

electrical/optical converting means (104), responsive to the combined video, telephony and control optical signal, for providing a combined video, telephony and control electrical signal; and demultiplexing means (106), responsive to the combined video, telephony and control electrical signal, for providing an ONU control signal, a video information signal, and a telephony signal.

13. A communication system as claimed in claim 12, wherein each of said plurality of subscriber optical network units (100) further comprises directional coupling means (108), responsive to the video information signal, for providing a plurality video information signals, all frequencies being passed to each set-top, where internal tuners select a desired channel.

14. A communication system as claimed in claim 13, wherein each of said plurality of subscriber optical network units (100) further comprises RJ interface means (112), responsive to the telephony signal, for providing an interfaced telephony signal.

15. A communication system as claimed in claim 14, wherein each of said plurality of subscriber optical network units (100) further comprises multiplexer means (114), responsive to the interfaced telephony signals and responsive to the ONU control signals, for providing a combined multiplexed telephony and ONU control signal.

16. A communication system as claimed in claim 15, wherein each of said plurality of subscriber optical network units (100) further comprises driver and electrical/optical conversion means (116, 120), responsive to the combined multiplexed telephony and ONU control signal, for providing the combine telephony and ONU control optical signal.

17. A communication system as claimed in claim 11, wherein said communication system further comprises a corresponding plurality of fiber optic waveguides; and each of the subscriber optical network units being connected by a respective one of the plurality of fiber optic waveguides to the central office, each subscriber optical network unit being disposed locally at a respective subscriber premise.

18. Apparatus as claimed in claim 17, wherein said communication system further comprises a plurality of frequency division multiplexers, each responsive to a bidirectional POTS and control signal and a bidirectional video information signal, each for providing a respective combined bidirectional video, POTS and control signal; and a corresponding plurality of electrical/optical converters, each responsive to one of the respective combined bidirectional video, POTS and control signal, each for providing a combined bidirectional POTS and video optical signal, which is bidirectionally transmitted via one fiber optic waveguide to one of the respective subscribers.

19. Apparatus as claimed in claim 17, wherein said communication system further comprises a plurality of first electrical/optical converters, each responsive to a bidirectional POTS and control signal, each for providing a bidirectional POTS and control optical signal, which is transmitted to and from the respective subscriber via a first fiber optic waveguide; and a corresponding plurality of second electrical/optical converters, each responsive to a bidirectional video signal, each for providing a respective bidirectional video optical signal, which is transmitted to and from one of the respective subscribers via a second fiber optic waveguide.

20. Apparatus as claimed in claim 17, wherein said communication system further comprises a plurality of first electrical/optical converters, each responsive to a bidirectional POTS and control signal, each for providing a respective bidirectional POTS and control optical signal, which is transmitted to and from one of the respective subscribers via a first fiber optic waveguide;

a plurality of second electrical/optical converters, each responsive to a bidirectional video signal, each for providing a respective bidirectional video optical signal, which is transmitted to and from one of the respective subscribers via a second fiber optic waveguide; and a corresponding plurality of wavelength division multiplexers, each responsive to the respective bidirectional POTS and control optical signal and the respective bidirectional video optical signal, each for providing a respective combined WDM bidirectional video, POTS and control optical signal.

21. A communication system as claimed in claim 17, wherein said communication system further comprises a plurality of first frequency division multiplexers, each responsive to a POTS and control signal and a video signal, each for providing a respective combined video, POTS and control electrical signal;

a plurality of first electrical/optical converters, each responsive to the respective combined video, POTS and control electrical signal, for providing a respective combined video, POTS and control optical signal for a respective subscriber;

a plurality of wavelength division multiplexers, each responsive to the respective combined video, POTS and control optical signal, for a respective subscriber, and the respective combined video, POTS and control optical signal, from the respective subscriber, each for providing a respective combined WDM video, POTS and control optical signal for a respective subscriber, and a respective combined video, POTS and optical signal from one of the respective subscribers;

a plurality of second electrical/optical converters, each responsive to the respective combined WDM video, POTS and control electrical signal from one of the respective subscribers, each for providing a respective combined video, POTS and control electrical signal for one of the respective subscribers; and a plurality of second frequency division multiplexers, each responsive to the respective combined video, POTS and control electrical signal for one of the respective subscribers, each for providing a POTS and control electric signal and a video electrical signal for one of the subscribers.

* * * * *